March 4, 1969     F. J. TENCZAR     3,430,497
FILTER PROBE
Filed May 3, 1967
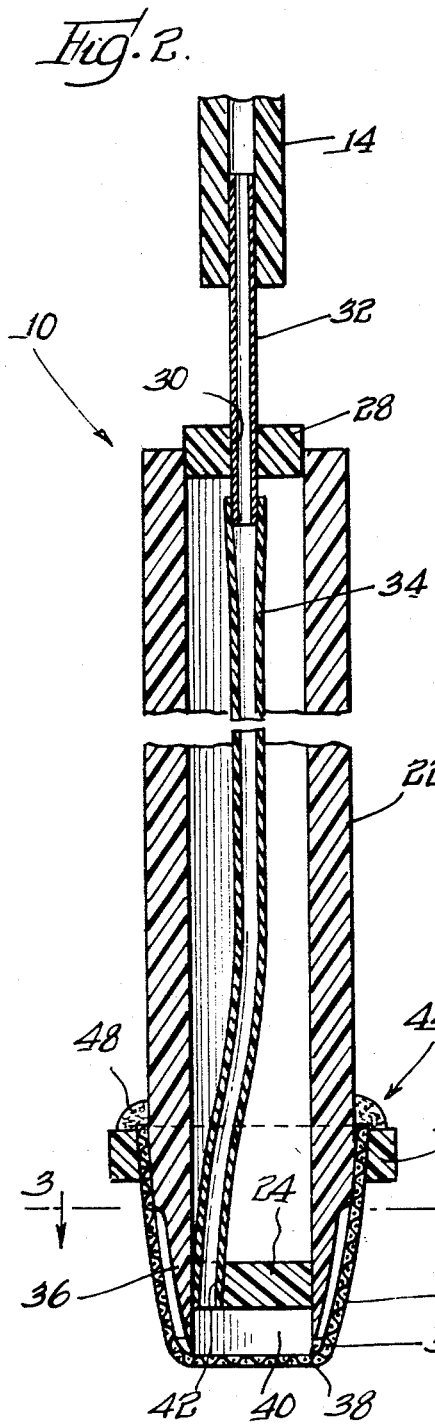
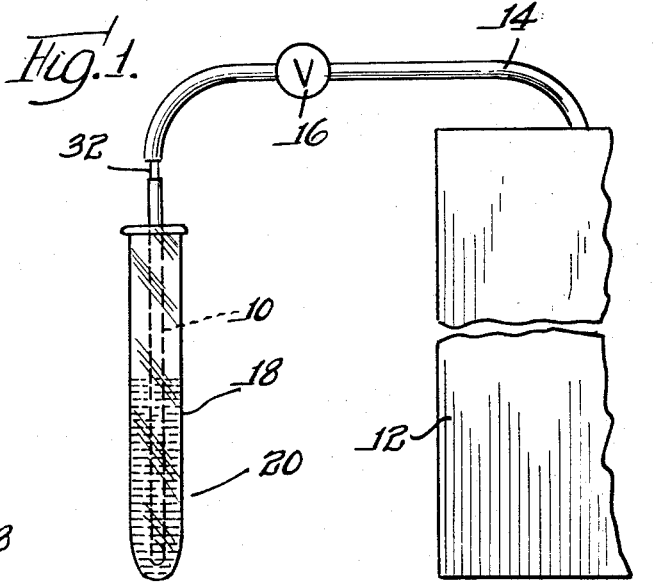
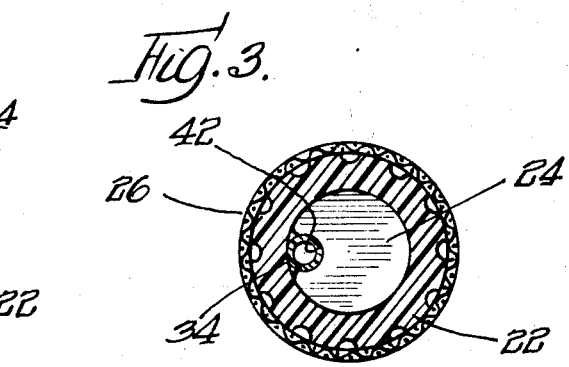
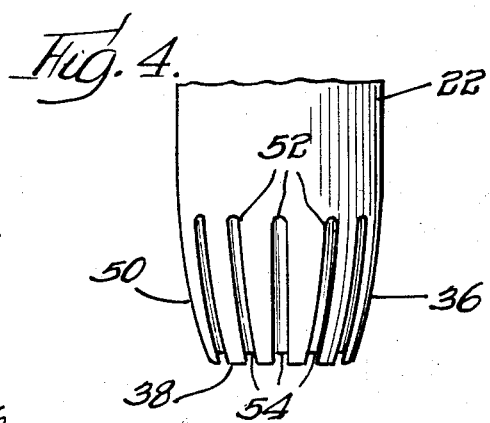
Inventor
Francis J. Tenczar
By: Olson, Trexler, Wolters & Bushnell attys

United States Patent Office 3,430,497
Patented Mar. 4, 1969

3,430,497
FILTER PROBE
Francis J. Tenczar, Chicago, Ill. (P.O. Box 919, Evergreen Park, Ill. 60642)
Filed May 3, 1967, Ser. No. 635,782
U.S. Cl. 73—425.6      3 Claims
Int. Cl. G01n 1/14

ABSTRACT OF THE DISCLOSURE

A microanalytical sampling device having a submersible chamber covered on one side by a filter and opening into a fluid-withdrawing passageway through an aperture of lesser area than the filter.

---

Spectrophotometric methods of qualitative and quantitative chemical analysis have achieved vast improvements in the accuracy and speed of laboratory work. Much of the advantage of such methods derives from the rapidity of measurement and the requirement of only a small quantity of material for each determination. However, obtaining suitable samples for analysis, especially repetitive samples for a series of analyses has proved difficult when the master sample comprises macro particles as well as colloidal particles in a dispersing medium. Specifically, problems have been encountered with larger particles obstructing the lumen of either the sampling device, the connecting tubing or valval devices.

The instant invention offers a solution to such problems by providing a filtered sampling probe; and an important object of the present invention is to provide a filtered sampling probe which resists clogging and which is easy to clean.

Another object of the invention is to provide a microanalytical sampling device which insures proper transfer of the sampled fluid.

These and other objects and features of the invention will become more apparent from a consideration of the following descriptions.

In the drawing:

FIG. 1 is an elevational view showing use of the sampling device of the invention in withdrawing a fluid sample from a test tube for transfer to analytical apparatus;

FIG. 2 is an enlarged view in central cross section showing the sampling device of FIG. 1;

FIG. 3 is an enlarged transverse sectional view taken substantially along the line 3—3 of FIG. 2; and FIG. 4 is an enlarged side elevational view showing the tapered tip of the tubular wand and the grooves and notches formed therein.

Referring now in detail to the drawing and giving first consideration to FIG. 1, a sampling device 10 constructed in compliance with the present invention is shown connected to analytical or testing apparatus 12, such as a spectrophotometer, by means of a flexible conduit 14. Flow is controlled by a suitable valve 16. The sampling device 10 is shown positioned for withdrawing a sample from a liquid 18 that is contained in a conventional glass test tube 20.

Turning to FIG. 2, the sampling device 10 comprises a tubular wand or housing 22, a circular wall or disc 24, and a porous member or filter 26. The upper end of tubular wand 22 is closed by means of an annular plug or disc 28 which is perforated with a central aperture 30. A rigid tube or needle 32 passes through the aperture 30 to extend in both directions from the plug 28. So positioned, the needle 32 may be slipped into the flexible conduit 14 forming a connection therewith and may be slipped into the upper end of a small caliber tubing 34 which is disposed within the wand 22. The needle 32 is securely mounted in the plug 28 by means of a press fit in the aperture 30 or by other suitable means, and the plug 28 itself is securely fastened in the upper end of wand 22 by cement, threaded connection or other convenient means of attachment.

Opposite the plug 28, the wand 22 includes a free end 36 which is intended for insertion in a fluid to be sampled, such as the liquid 18 in test tube 20; and in compliance with the principles of the present invention, the disc 24 is mounted in the wand 22 spaced inwardly a short distance from distal edge 38 of this free end whereby to define a fluid-receiving chamber 40. Advantageously, the porous element 26 is arranged to span the free end 36 of the wand to cooperate with the disc 24 in defining the chamber 40.

Continuing with reference to FIG. 2 and with secondary reference to FIG. 3, in order to pass filtered fluid from the chamber 40, the disc 24 is fashioned with an aperture 42 into which the lower end of tubing 34 may be inserted. Thus, a fluid passageway is completed from the chamber 40 to the conduit 14 through the tube 34 and the needle 32. In the illustrated embodiment, the aperture 42 comprises a longitudinally extending, peripheral groove in the disc 24. This aperture may, if desired, be located inwardly from the edge of the disc or it may be comprised of a spiral groove at the edge of the disc. In compliance with the present invention, the cross-sectional area of the lumen of tubing 34 is arranged to be only a fraction of the effective area of porous element 26, the effective area of the porous element being principally defined by the cross-sectional area of the lumen of wand 22. Thus, the tubing 34 withdraws fluid from a relatively large collecting chamber and the velocity of fluid through the filter element is advantageously less than the velocity of fluid through the tubing 34. Efficiency of filtration and assurance of fluid flow are thus obtained.

While the filter element 26 is shown to be a filter cloth, specifically a woven mesh of monofilament nylon, other porous elements may also be used, for example filter paper, fine metal mesh, synthetic fiber screening, nonwoven fabrics and ceramic members. Regardless of the construction of the filter element, the instant application contemplates means for securing the filter element to the free end 36 of the wand 22; and in the illustrated embodiment, securing means 44 include an annular member or collar 46 and a ring 48 of cement which adhesively attaches the collar 46 and the edge of filter element 26 to the outside surface of wand 22. This means of attachment can be accomplished in many other ways, e.g., screws and the like, so as to effect a seal in the area illustrated by the collar 46.

Since the intended use of the sampling device 10 is in the field of chemical analysis, all of the components which are to be exposed to the sampled medium are desirably selected to be chemically inert with respect to the sampled medium. Accordingly, such materials as acrylic resins, polyolefins, fluorocarbons and stainless steel are used in fabricating the various components of the sampling device.

In compliance with yet another feature of the invention, the free end of wand 22 is fashioned with a taper 50, as is best shown in FIG. 4, in order that the probe may penetrate more easily into the tapered bottom of a test tube or other receptacle to effect a more complete evacuation. In addition, the free end 36 of the wand is fashioned with a plurality of longitudinally extending, arcuately spaced grooves 52 which serve to enhance the effective filtering area and which facilitate passage of filtered fluid into the chamber 40. The grooves, so spaced, constitute trough means with intervening crest, or ridge structures. Furthermore, the distal edge 38 of the free end of wand 22 is provided with arcuately spaced notches 54 in order that the tip of the sampling device may be placed in contact with a flat surface without cutting off flow into the chamber 40. As is shown in FIG. 4, the notches 54 are desirably made coincident with the grooves 52.

While the sampling device 10 is constructed so as to develop chamber 40, it is, of course, desirable to keep the volume of this chamber to a minimum so that successive samples will not be unduly contaminated with residual quantities of previously sampled material. For example, tubing 34 may, if desired, extend into chamber 40. Moreover, the mesh openings in the porous element 26 are advantageously selected to be smaller than the cross-sectional area of the smallest lumen to be encountered in the transport of sample material from the sampling device through the associated testing apparatus and in any event less than the cross-sectional area of the lumen of tubing 34. Thus, the filter element 26 will prevent any macro particles of sufficient size to cause an obstruction from entering the fluid transfer system.

In use, the sampling device 10 will be assembled to the inlet conduit 14, as described; and the sampling device will be manually manipulated into fluid-withdrawing relationship relative to a quantity of material to be sampled. Suction applied to the conduit 14 will cause sample fluid to be drawn through the filter element 26 and into the chamber 40 when the valve 16 is opened. Fluid drawn into the chamber 40 will pass through the described transport system of the sampling device and into the conduit 14. In other respects, the use and operation of the sampling device 10 will be apparent to those skilled in the art from the foregoing descriptions.

The specific embodiment herein shown and described is to be considered primarily illustrative. Various changes in structure will, no doubt, occur to those skilled in the art; and such changes are to be understood as forming a part of this invention insofar as they fall within the spirit and scope of the appended claims.

I claim:

1. A sampling device comprising: a tubular wand having a free end for insertion in a fluid to be sampled; transverse wall means in said wand spaced inwardly from the distal edge of said free end to define a fluid-receiving chamber, including an aperture therethrough communicating with said chamber; porous means spanning the free end of said wand to define a filter of greater area than said aperture; means securing said porous means to said wand; and spaced crest means on the tip portion of said free end and covered by said porous means, said crest means defining trough means therebetween whereby to enhance the effective filtering area of the device.

2. A sampling device according to claim 1 wherein said trough means comprises a plurality of longitudinally extending, arcuately spaced grooves.

3. A sampling device according to claim 2 wherein the distal ends of said grooves have notches.

References Cited

UNITED STATES PATENTS

| 32,361 | 5/1861 | Hall | 210—463 |
| 1,967,785 | 7/1934 | Schacht | 210—463 |
| 2,376,231 | 7/1945 | Cohn | 73—425.4 |
| 3,273,402 | 9/1966 | Farr | 73—425.6 |

LOUIS R. PRINCE, *Primary Examiner.*

D. E. CORR, *Assistant Examiner.*